United States Patent
Fang et al.

(10) Patent No.: US 12,010,694 B2
(45) Date of Patent: Jun. 11, 2024

(54) DATA SENDING AND RECEIVING METHOD, DEVICE, SYSTEM, TERMINAL, BASE STATION, AND STORAGE MEDIUM

(71) Applicant: ZTE CORPORATION, Guangdong (CN)

(72) Inventors: Huiying Fang, Guangdong (CN); Bo Dai, Guangdong (CN); Weiwei Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 524 days.

(21) Appl. No.: 17/279,824

(22) PCT Filed: Sep. 29, 2019

(86) PCT No.: PCT/CN2019/108845
§ 371 (c)(1),
(2) Date: Mar. 25, 2021

(87) PCT Pub. No.: WO2020/063941
PCT Pub. Date: Apr. 2, 2020

(65) Prior Publication Data
US 2022/0039069 A1     Feb. 3, 2022

(30) Foreign Application Priority Data
Sep. 28, 2018   (CN) .......................... 201811142359.7

(51) Int. Cl.
*H04W 72/23*     (2023.01)
*H04L 5/00*      (2006.01)
(Continued)

(52) U.S. Cl.
CPC ........... *H04W 72/23* (2023.01); *H04L 5/0007* (2013.01); *H04L 5/0053* (2013.01); *H04L 27/2602* (2013.01); *H04W 4/70* (2018.02)

(58) Field of Classification Search
CPC ...... H04W 72/23; H04W 4/70; H04L 5/0007; H04L 5/0053; H04L 27/2602
See application file for complete search history.

(56) References Cited

U.S. PATENT DOCUMENTS 10,159,090 B2 *   12/2018   You ...................... H04W 72/23
2017/0034798 A1    2/2017   Lin et al.
(Continued)

FOREIGN PATENT DOCUMENTS

CN    105471561 A    4/2016
CN    105763290 A    7/2016
(Continued)

OTHER PUBLICATIONS

International Search Report for the International Patent Application No. PCT/CN2019/108845, dated Dec. 27, 2019, 2 pages.
(Continued)

*Primary Examiner* — Chandrahas B Patel
(74) *Attorney, Agent, or Firm* — KDW Firm PLLC (57) ABSTRACT

Provided are a data sending and receiving method, an apparatus, a system, a terminal, a base station and a storage medium. Data carried in a non-Long-Term Evolution (non-LTE) downlink control region of a subframe is mapped to an LTE downlink control region of the subframe, and data carried in the non-LTE downlink control region and the LTE downlink control region of the subframe is sent to an MTC terminal.

18 Claims, 4 Drawing Sheets

(51) Int. Cl.
*H04L 27/26* (2006.01)
*H04W 4/70* (2018.01)

(56) References Cited

U.S. PATENT DOCUMENTS

| | | | |
|---|---|---|---|
| 2017/0289899 A1 | 10/2017 | You et al. | |
| 2017/0289973 A1* | 10/2017 | Yang | H04L 5/0048 |
| 2019/0082430 A1* | 3/2019 | Li | H04L 1/0061 |
| 2019/0098608 A1* | 3/2019 | Yi | H04L 5/00 |

FOREIGN PATENT DOCUMENTS

| | | | |
|---|---|---|---|
| CN | 105763305 | A | 7/2016 |
| CN | 106797642 | A | 5/2017 |
| WO | 2013026414 | A1 | 2/2013 |
| WO | 2013107252 | A1 | 7/2013 |

OTHER PUBLICATIONS

First Search Report dated Nov. 2, 2022, for Chinese Patent Application No. 20181142359.7 (eight (8) pages).
Notification of the First Review Opinion dated Nov. 18, 2022, for Chinese Patent Application No. 20181142359.7 (16 pages).
Sony, "DL transmission in the LTE control channel region", 3GPP TSG RAN WG1 Meeting #94 R1-1808353, Gothenburg, Sweden, Aug. 20-24, 2018.
Nokia et al., "Consideration on the usage of LTE control channel region", 3GPP TSG RAN WG1 Meeting #94 R1-1808437, Gothenburg, Sweden, Aug. 20-24, 2018.
Zte, "Discussion on use of LTE control channel region for DL transmission", 3GPP TSG RAN WG1 Meeting #94 R1-1808638, Gothenburg, Sweden, Aug. 20-24, 2018.
Nokia et al., "Use of LTE Control Channel Region for DL Transmission Summary", 3GPP TSG RAN WG1 Meeting #94 R1-1809530, Gothenburg, Sweden, Aug. 20-24, 2018.

* cited by examiner

FIG. 11

DATA SENDING AND RECEIVING METHOD, DEVICE, SYSTEM, TERMINAL, BASE STATION, AND STORAGE MEDIUM

CROSS-REFERENCE TO RELATED APPLICATIONS

This is a National Stage Application filed under 35 U.S.C. 371 based on International Patent Application No. PCT/CN2019/108845, filed on Sep. 29, 2019, which claims priority to Chinese Patent Application No. 201811142359.7 filed on Sep. 28, 2018, disclosures of both of which are incorporated herein by reference in their entireties.

TECHNICAL FIELD

Embodiments of the present disclosure relate to, but are not limited to, the field of machine-type communication (MTC) and, in particular, relate to, but are not limited to, a data sending and receiving method, an apparatus, a system, a terminal, a base station and a storage medium.

BACKGROUND

Machine-type communication (MTC), also referred to as machine-to-machine (M2M), is an application form of the Internet of Things. An MTC terminal based on Long-Term Evolution/Long Term Evolution Advanced (LTE/LTE-A) is generally deployed under a same system bandwidth as a legacy LTE/LTE-A terminal. In the related art, an LTE system supporting the MTC terminal (that is, a Long-Term Evolution-machine-type communication (LTE-MTC) system) needs to retain an original LTE physical downlink control channel (PDCCH) control region to maintain backward compatibility with a legacy LTE terminal. However, as the legacy LTE terminal slowly disappears on the market or in a newly-deployed frequency band, the LTE system supporting MTC does not need to support the legacy LTE terminal and is a system with the MTC independently deployed.

In a system with LTE-MTC independently deployed, data of an MTC user is transmitted in a non-LTE PDCCH control region (LTE downlink control region) so that a downlink transmission is relatively weak.

SUMMARY

Embodiments of the present disclosure provide a data sending and receiving method for MTC, an apparatus, a system, a terminal, a base station and a storage medium. The embodiments of the present disclosure provide a data sending method. The method includes steps described below.

Data carried in a non-LTE downlink control region of a subframe is mapped to an LTE downlink control region of the subframe.

Data carried in the non-LTE downlink control region and the LTE downlink control region of the subframe is sent to an MTC terminal.

The embodiments of the present disclosure further provide a data receiving method. The method includes steps described below.

Data carried in a non-LTE downlink control region and an LTE downlink control region of a subframe is received.

Mapped data is determined, where the mapped data is carried in the LTE downlink control region and mapped from the non-LTE downlink control region.

The mapped data is merged with data carried in the LTE downlink control region.

The embodiments of the present disclosure further provide a data sending and receiving method. The method includes steps described below.

A base station maps data carried in a non-LTE downlink control region of a subframe to an LTE downlink control region of the subframe.

The base station sends data carried in the non-LTE downlink control region and the LTE downlink control region of the subframe to a machine-type communication (MTC) terminal.

The MTC terminal receives the data carried in the non-LTE downlink control region and the LTE downlink control region of the subframe.

The MTC terminal determines mapped data that is carried in the LTE downlink control region and mapped from the non-LTE downlink control region.

The MTC terminal merges the mapped data with data carried in the LTE downlink control region.

The embodiments of the present disclosure further provide an apparatus. The apparatus includes a mapping module and a sending module.

The mapping module is configured to map data carried in a non-LTE downlink control region of a subframe to an LTE downlink control region of the subframe.

The sending module is configured to send data carried in the non-LTE downlink control region and the LTE downlink control region of the subframe to an MTC apparatus.

The embodiments of the present disclosure further provide an MTC apparatus. The MTC apparatus includes a receiving module, a determining module and a merging module.

The receiving module is configured to receive data carried in a non-LTE downlink control region and an LTE downlink control region of a subframe.

The determining module is configured to determine mapped data that is carried in the LTE downlink control region and mapped from the non-LTE downlink control region.

The merging module is configured to merge the mapped data with data carried in the LTE downlink control region.

The embodiments of the present disclosure further provide an LTE-MTC system including an apparatus and an MTC apparatus.

The apparatus is configured to map data carried in a non-LTE downlink control region of a subframe to an LTE downlink control region of the subframe and send data carried in the non-LTE downlink control region and the LTE downlink control region of the subframe to the MTC apparatus.

The MTC apparatus is configured to receive the data carried in the non-LTE downlink control region and the LTE downlink control region of the subframe, determine mapped data that is carried in the LTE downlink control region and mapped from the non-LTE downlink control region, and merge the mapped data with data carried in the LTE downlink control region.

The embodiments of the present disclosure further provide a base station. The base station includes a first processor, a first memory and a first communication bus.

The first communication bus is configured to enable connection and communication between the first processor and the first memory.

The first processor is configured to execute one or more programs stored in the first memory to perform steps of the preceding data sending method.

The embodiments of the present disclosure further provide an MTC terminal. The MTC terminal includes a second processor, a second memory and a second communication bus.

The second communication bus is configured to enable connection and communication between the second processor and the second memory.

The second processor is configured to execute one or more programs stored in the second memory to perform steps for data receiving described above.

The embodiments of the present disclosure further provide a system apparatus. The system apparatus includes a third processor, a third memory and a third communication bus.

The third communication bus is configured to enable connection and communication between the third processor and the third memory.

The third processor is configured to execute one or more programs stored in the third memory to perform steps of the preceding data sending and receiving method.

The embodiments of the present disclosure further provide a storage medium which stores one or more programs. The one or more programs are executable by one or more processors so that steps of the preceding data sending method and/or steps of the preceding data receiving method and/or steps of the preceding data sending and receiving method are performable.

According to the data sending and receiving method, the apparatus, the terminal, the base station and the storage medium provided by the embodiments of the present disclosure, the data carried in the non-LTE downlink control region is mapped to the LTE downlink control region of the same subframe and the data carried in the non-LTE downlink control region and the LTE downlink control region of the subframe is sent to the MTC terminal. In the embodiments of the present disclosure, data of an MTC user is sent by using the original LTE downlink control region, that is, the data is sent by using the LTE downlink control region that is no longer required, which can improve downlink transmission performance of an MTC device and improve a peak rate of the MTC user.

Other features and corresponding beneficial effects of the present disclosure are set forth later in the description, and it should be understood that at least part of the beneficial effects become apparent from the description of the present disclosure.

DETAILED DESCRIPTION

Embodiment One

Figure 1:
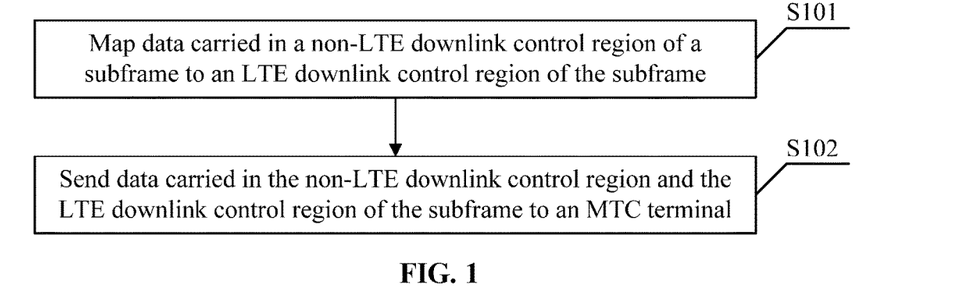
FIG. 1 is a flowchart of a data sending method according to embodiment one of the present disclosure.

In embodiments of the present disclosure, the data of the MTC user is sent by using both the original LTE downlink control region and the original non-LTE downlink control region, so as to enhance the downlink transmission. Referring to FIG. 1 which illustrates a data sending method provided by this embodiment, the data sending method includes steps described below.

In S101, data carried in a non-LTE downlink control region of a subframe is mapped to an LTE downlink control region of the subframe.

Figure 2:
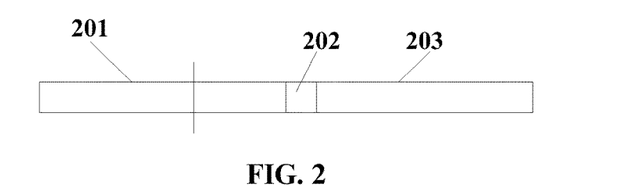
FIG. 2 is a schematic diagram illustrating that data in a non-LTE downlink control region is mapped to an LTE downlink control region according to embodiment one of the present disclosure.

In the system with LTE-MTC independently deployed, each subframe includes an LTE downlink control region and a non-LTE downlink control region. The number of orthogonal frequency-division multiplexing (OFDM) symbols occupied by a PDCCH in time domain in one subframe is the LTE downlink control region of the subframe, and a region other than the LTE downlink control region in the subframe is referred to as the non-LTE downlink control region for carrying data to be transmitted. In the embodiment of the present disclosure, as shown in FIG. 2, an idle LTE downlink control region is fully utilized and partial data 202 carried in a non-LTE downlink control region 201 is mapped to the LTE downlink control region 203. Notably, mapping the partial data 202 in the non-LTE downlink control region 201 to the LTE downlink control region 203 refers to replicating the partial data 202 to the LTE downlink control region 203. Which part of data in the non-LTE downlink control region is mapped to which position of the LTE downlink control region is determined in a mapping manner. The mapping manner includes at least manners described below.

Manner one: an index of an OFDM symbol to be mapped in the non-LTE downlink control region is determined based on a sequence number of resending of the data carried in the non-LTE downlink control region, and data on the OFDM symbol corresponding to the index is mapped to the LTE downlink control region. That is, the index of the OFDM symbol where the partial data carried in the non-LTE downlink control region and mapped to the LTE downlink control region is located may be determined. It is to be understood that the sequence number of resending of the data refers to which time the data is resent for. For example, when the sequence number of resending of the data is 4, it indicates that the data sent in the non-LTE downlink control region of the subframe is resent for the fourth time. It may be understood that a method for enhancing coverage in MTC is to repeat a channel that carries data. For example, the number of times a physical downlink shared channel (PDSCH) is resent may be configured to be 2, 4, 8, 16, 32, 64, 128, . . . , and so on.

Figure 3:
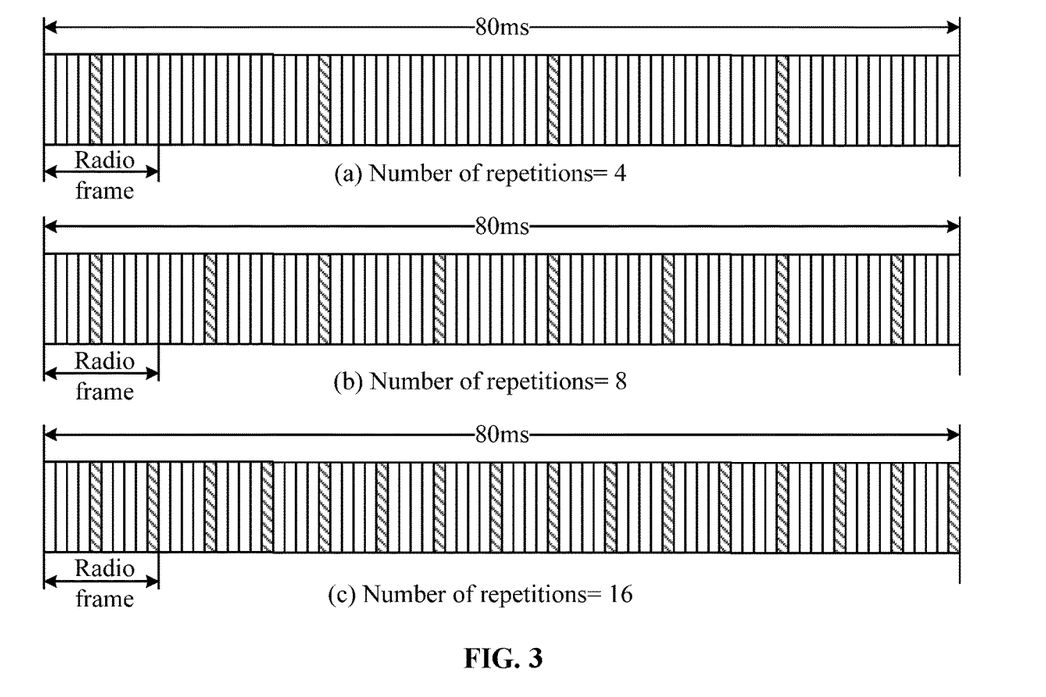
FIG. 3 is a schematic diagram of resending of an MTC system message according to embodiment one of the present disclosure.

Notably, in response to the data carried in the non-LTE downlink control region including an MTC system message, the index of the OFDM symbol to be mapped in the non-LTE downlink control region is determined based on a sequence number of resending of the MTC system message in a sending period of the MTC system message, and the data on the OFDM symbol corresponding to the index is mapped to the LTE downlink control region. For example, as shown in FIG. 3, FIG. 3 is a schematic diagram of resending of the MTC system message. In FIG. 3a, the MTC system message is resent four times within a sending period of 80 ms of the MTC system message. In FIG. 3b, the MTC system message is resent eight times within the sending period of 80 ms of the MTC system message. Therefore, the sequence number of resending of the MTC system message in the sending period of the MTC system message may be determined. Of course, the sequence number of resending is less than or equal to the total number of repetitions. In the embodiment of the present disclosure, the step in which the index of the OFDM symbol to be mapped in the non-LTE downlink control region is determined, and the data on the OFDM symbol corresponding to the index is mapped to the LTE downlink control region includes: in response to the sequence number of resending of the MTC system message in the sending period being n and a length of the LTE downlink control region being L (or a sequence number of a starting symbol in the non-LTE downlink control region being L), mapping data on a $(x_i+1)$-th OFDM symbol in the non-LTE downlink control region to an $(i+1)$-th OFDM symbol in the LTE downlink control region.

$$x_i = \left(\left\lfloor \frac{n-1}{T} \right\rfloor * L + i\right) \bmod (P-L),$$

where $i=0, \ldots, L-1$, T denotes a cyclic period of a redundancy version of the system message, and P denotes the number of OFDM symbols in the subframe. In some embodiments, $T=4$ and $P=14$. For example, when the MTC system message is sent for the fifth time in the sending period, T is 4, and it is assumed that the length of the LTE downlink control region is 3 and the number of OFDM symbols in one subframe is 14, $x_i=([4/4]*3+i) \bmod (14-3)$ and further $x_i=(3+i) \bmod 11$. When $i=2$, $x_i=5 \bmod 11=5$, that is, data on a sixth OFDM symbol in the non-LTE downlink control region is replicated to a third OFDM symbol in the LTE downlink control region.

In response to the data carried in the non-LTE downlink control region including MTC downlink control channel data, the index of the OFDM symbol to be mapped in the non-LTE downlink control region is determined based on a sequence number of resending of the MTC downlink control channel data, and MTC downlink control channel data on the OFDM symbol corresponding to the index is mapped to the LTE downlink control region. For a subframe for transmitting an MTC control channel in the non-LTE downlink control region, in response to the sequence number of resending of the MTC downlink control channel data being n and the length of the LTE downlink control region being L, MTC downlink control channel data on a $(x_i+1)$-th OFDM symbol in the non-LTE downlink control region is mapped to an $(i+1)$-th OFDM symbol in the LTE downlink control region; where $x_i=((n-1) \times L+i) \bmod (P-L)$, where $i=0, \ldots, L-1$ and P denotes the number of OFDM symbols in the subframe. In some embodiments, $P=14$. For example, when an MTC downlink control channel is resent for the fourth time, the length of the LTE downlink control region is 3, and the number of OFDM symbols in one subframe is 14, $x_i=(9+i) \bmod (14-3)$ and further $x_i=(9+i) \bmod 11$. When $i=2$, $x_i=11 \bmod 11=0$, that is, data on a first OFDM symbol in the non-LTE downlink control region is replicated to a third symbol in the LTE downlink control region of the current subframe.

Figure 4:
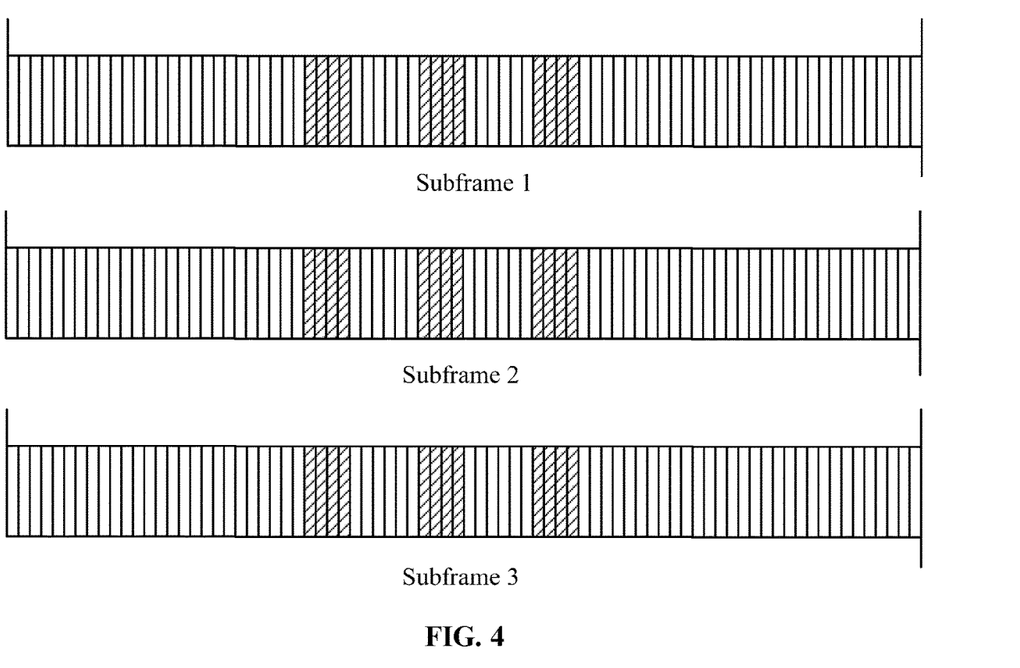
FIG. 4 is a schematic diagram of Z subframes that maintain the same redundancy version in the case of a redundancy version cycle of MTC downlink data channel data according to embodiment one of the present disclosure.

In response to the data carried in the non-LTE downlink control region including MTC downlink data channel data, with a unit of Z subframes, the index of the OFDM symbol to be mapped in the non-LTE downlink control region is determined based on a sequence number of resending of the MTC downlink data channel data in the Z subframes, and MTC downlink data channel data on the OFDM symbol corresponding to the index is mapped to the LTE downlink control region. In the embodiment of the present disclosure, a mapping rule is determined with a unit of Z subframes, the same mapping manner is adopted in the Z subframes, and the Z subframes maintain the same redundancy version in the case of a redundancy version cycle of the MTC downlink data channel data. MTC downlink control data channel data includes an MTC physical downlink control channel (MPDCCH) and the PDSCH. For example, as shown in FIG. 4, non-LTE downlink control regions of a subframe 1, a subframe 2 and a subframe 3 carry the MTC downlink data channel data, and the MTC downlink data channel data is resent at same positions for the same number of times. Further, with a unit of three subframes, the index of the OFDM symbol where the MTC downlink data channel data mapped to the LTE downlink control region is located in each subframe is determined based on the sequence number of resending of the MTC downlink data channel data in three subframes. In some embodiments, the step in which the index of the OFDM symbol where the MTC downlink data channel data mapped to the LTE downlink control region is located is determined based on the sequence number of resending of the MTC downlink data channel data in the Z subframes includes: in response to the sequence number of resending of the MTC downlink data channel data in the Z subframes being n and the length of the LTE downlink control region being L, mapping MTC downlink data channel data on a $(x_i+1)$-th OFDM symbol in the non-LTE downlink control region to an $(i+1)$-th OFDM symbol in the LTE downlink control region.

$$x_i = \left(\left(n-1-\left\lfloor \frac{n-1}{Z} \right\rfloor \times Z\right) \times L + i\right) \bmod (P-L),$$

Z denotes the number of subframes that maintain the same redundancy version in the case of the redundancy version cycle of the MPDCCH/PDSCH. In some embodiments, $Z=1, 4, 5$ or 10 and $P=14$. For example, when an MTC downlink data channel is resent for the eighth time, the length of the LTE downlink control region is 3, Z is 4, and P is 14, $x_i=((7-[7/4] \times 4) \times 3+i) \bmod 11$ and further $x_i=(9+i) \bmod 11$. When $i=2$, $x_i=11 \bmod 11=0$, that is, data on a first OFDM symbol in the non-LTE downlink control region is replicated to a third symbol in the LTE downlink control region of the current subframe.

Manner two: an index of data to be mapped in the non-LTE downlink control region is determined based on whether a symbol in the non-LTE downlink control region includes a preset reference signal, and MTC downlink control channel data on an OFDM symbol corresponding to the index is mapped to the LTE downlink control region. In the embodiment of the present disclosure, the preset reference signal includes a cell-specific reference signal (CRS).

The CRS is used for downlink channel estimation, downlink resource scheduling, handover measurement and downlink channel quality monitoring.

In some embodiments, when the non-LTE downlink control region includes the CRS, data on an OFDM symbol that includes the CRS in the non-LTE downlink control region is mapped to an OFDM symbol that includes the CRS in the LTE downlink control region. Notably, which specific symbol includes the CRS is related to a length of an LTE downlink control channel region. For a better understanding of how to map the data in the non-LTE downlink control region to the LTE downlink control region in mapping manner two, an example is provided used for description here. Assuming that a fifth OFDM symbol in the non-LTE downlink control region of the subframe includes the CRS and a third OFDM symbol in the LTE downlink control region includes the CRS, data on the fifth OFDM symbol in the non-LTE downlink control region is mapped to the third OFDM symbol in the LTE downlink control region. When the non-LTE downlink control region does not include the CRS, data on an OFDM symbol that does not include the CRS in the non-LTE downlink control region is mapped to an OFDM symbol that does not include the CRS in the LTE downlink control region. For example, data on a seventh OFDM symbol and a fourteenth OFDM symbol neither of which includes the CRS in the non-LTE downlink control region is mapped to a fourth OFDM symbol that does not include the CRS in the LTE downlink control region.

Manner three: a rate of a system message, a paging message, or a random access response message carried in the non-LTE downlink control region is matched to (X+Y) bits, X bits are mapped to a non-LTE downlink control region, and Y bits are mapped to an LTE downlink control region. In the embodiment of the present disclosure, the system message, the paging message, or the random access response message is encoded, and bits after encoding are greater than X bits before encoding. The bits after encoding are first matched to X bits, and redundant bits are matched to Y bits. Further, X+Y bits are obtained by means of matching, the X bits are mapped to the non-LTE downlink control region, and the Y bits are mapped to the LTE downlink control region. In some embodiments, compared with the bits before encoding, the redundant bits of the bits after encoding are repeated bits. Therefore, the repeated bits may be mapped to the non-LTE downlink control region. The step of mapping the Y bits to the LTE downlink control region includes mapping the Y bits to an LTE downlink control region of at least one subframe. When the step of mapping the Y bits to the LTE downlink control region includes mapping the Y bits to LTE downlink control regions of two subframes, the Y bits are firstly mapped to an LTE downlink control region of a same subframe where the X bits are mapped, and remaining bits of the Y bits are mapped to an LTE downlink control region of the other subframe.

In S102, data carried in the non-LTE downlink control region and the LTE downlink control region of the subframe is sent to an MTC terminal.

In the embodiment of the present disclosure, the LTE downlink control region of the subframe carries the data mapped from the non-LTE downlink control region so that a base station can send data by using the LTE downlink control region of the subframe.

In the data sending method for MTC provided by the embodiment of the present disclosure, the data carried in the non-LTE downlink control region is mapped to the LTE downlink control region of the same subframe and the data carried in the non-LTE downlink control region and the LTE downlink control region of the subframe is sent to the MTC terminal. In this manner, the MTC downlink control channel data or the MTC downlink data channel data of the user is sent by using the LTE downlink control region that is no longer required, which can improve downlink transmission performance of an MTC device and improve a peak rate of an MTC user.

Embodiment Two

Figure 5:
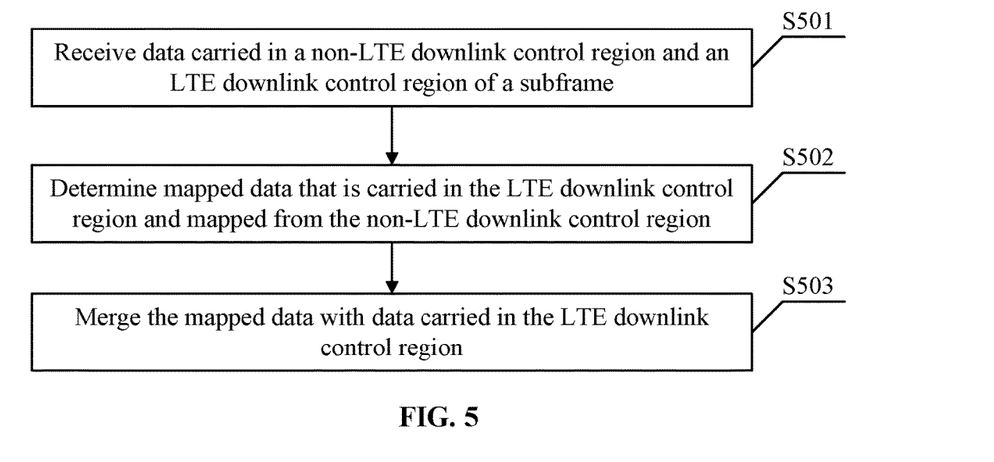
FIG. 5 is a flowchart of a data receiving method according to embodiment two of the present disclosure.

Based on embodiment one in which a base station sends data carried in a non-LTE downlink control region and an LTE downlink control region of a subframe, an embodiment of the present disclosure provides a data receiving method performed by an MTC terminal. As shown in FIG. 5, the data receiving method includes steps described below.

In S501, the data carried in the non-LTE downlink control region and the LTE downlink control region of the subframe is received.

In the embodiment of the present disclosure, the non-LTE downlink control region of the subframe carries data, and data carried in the LTE downlink control region is obtained by mapping part of the data in the non-LTE downlink control region, where the mapping refers to replication. Therefore, the data received by the MTC terminal may include repeated data.

In S502, mapped data is determined, where the mapped data is carried in the LTE downlink control region and mapped from the non-LTE downlink control region.

Notably, in the embodiment of the present disclosure, the MTC terminal knows a mapping manner in which the base station maps the data in the non-LTE downlink control region to the LTE downlink control region. The mapping manner may be sent to the MTC terminal after predetermined by the base station or may be determined through a negotiation between the MTC terminal and the base station, which is not limited here. For the MTC terminal, the MTC terminal may determine, according to the mapping manner, which part of data is mapped from the non-LTE downlink control region to obtain the data carried in the LTE downlink control region. The mapping manner includes at least manners described below.

Manner one: an index of an OFDM symbol that is mapped from the non-LTE downlink control region to the LTE downlink control region is determined based on a sequence number of resending of data carried in the non-LTE downlink control region, and data on the OFDM symbol corresponding to the index is used as the mapped data. It is to be understood that the sequence number of resending of the data refers to which time the data is resent for. For example, when the sequence number of resending of the data is 4, it indicates that the data sent in the non-LTE downlink control region of the subframe is resent for the fourth time.

In the embodiment of the present disclosure, the index of the OFDM symbol in the non-LTE downlink control region is determined in a different manner according to different data carried in the non-LTE downlink control region. If an MTC system message is transmitted in the non-LTE downlink control region of the subframe, the index of the OFDM symbol that is mapped from the non-LTE downlink control region to the LTE downlink control region is determined based on a sequence number of resending of the MTC system message in a sending period of the MTC system message, and the data on the OFDM symbol corresponding to the index is used as the mapped data. In some embodiments, the step of determining the index based on the sequence number of resending and using the data on the OFDM symbol corresponding to the index as the mapped data includes: in response to an n-th time of resending of the MTC system message in the sending period (the sequence number of resending being n) and a length of the LTE downlink control region being L, determining data on an (i+1)-th OFDM symbol in the LTE downlink control region to be mapped data that is mapped from a ($x_i$+1)-th OFDM symbol in the non-LTE downlink control region; where $$x_i = \left(\left\lfloor \frac{n-1}{T} \right\rfloor * L + i\right) \mod (P-L),$$

where i=0, . . . , L−1, T denotes a cyclic period of a redundancy version of the MTC system message, and P denotes the number of OFDM symbols in the subframe. In some embodiments, T=4 and P=14. When the MTC system message is sent for the third time in the sending period, T is 4, and it is assumed that the length of the LTE downlink control region is 3 and the number of OFDM symbols in one subframe is 14, $x_i$=([2/4]*3+i) mod (14−3). When i=2, $x_i$=2 mod 11=2, that is, data on a third OFDM symbol in the LTE downlink control region is mapped data that is mapped from a third OFDM symbol in the non-LTE downlink control region.

If an MTC control channel is transmitted in the non-LTE downlink control region of the subframe, the index of the OFDM symbol that is mapped from the non-LTE downlink control region to the LTE downlink control region is determined based on a sequence number of resending of MTC downlink control channel data, and MTC downlink control channel data on the OFDM symbol corresponding to the index is used as the mapped data. In some embodiments, in response to an n-th time of resending of an MTC downlink control channel (the sequence number of resending being n) and the length of the LTE downlink control region being L (or a sequence number of a starting symbol in the non-LTE downlink control region being L), data on an (i+1)-th OFDM symbol in the LTE downlink control region is determined to be mapped data that is mapped from a ($x_i$+1)-th OFDM symbol in the non-LTE downlink control region; where $x_i$=((n−1)×L+i) mod (P−L), where i=0, . . . , L−1 and P denotes the number of OFDM symbols in the subframe. For example, when the MTC downlink control channel is resent for the fourth time, the length of the LTE downlink control region is 3, and the number of OFDM symbols in one subframe is 14, $x_i$=(9+i) mod (14-3) and further $x_i$=(9+i) mod 11. When i=2, $x_i$=11 mod 11=0, that is, data on a third OFDM symbol in the LTE downlink control region is determined to be mapped data that is mapped from a first OFDM symbol in the non-LTE downlink control region.

If an MTC downlink data channel is transmitted in the non-LTE downlink control region of the subframe, with a unit of Z subframes, the index of the OFDM symbol that is mapped from the non-LTE downlink control region to the LTE downlink control region is determined based on a sequence number of resending of MTC downlink data channel data in the Z subframes, and MTC downlink control channel data on the OFDM symbol corresponding to the index is used as the mapped data. A mapping rule is determined with a unit of Z subframes, the same mapping manner is adopted in the Z subframes, and the Z subframes maintain the same redundancy version in the case of a redundancy version cycle of the MTC downlink data channel data. In some embodiments, in response to an n-th time of resending of the MTC downlink data channel (the sequence number of resending being n) and the length of the LTE downlink control region being L (or the sequence number of the starting symbol in the non-LTE downlink control region being L), data on an (i+1)-th OFDM symbol in the LTE downlink control region is determined to be mapped data that is mapped from a ($x_i$+1)-th OFDM symbol in the non-LTE downlink control region; where $$x_i = \left(\left(n-1-\left\lfloor \frac{n-1}{Z} \right\rfloor \times Z\right) \times L + i\right) \mod (P-L),$$

where i=0, . . . , L−1, Z denotes the number of subframes that maintain the same redundancy version in the case of the redundancy version cycle of the MTC downlink data channel data, and P denotes the number of OFDM symbols in the subframe. For example, when the MTC downlink data channel is resent for the eighth time, the length of the LTE downlink control region is 3, Z is 4, and P is 14, $x_i$=((7−[7/4]×4)×3+i) mod 11. When i=2, $x_i$=11 mod 11=0, that is, data on a third OFDM symbol in the LTE downlink control region is determined to be mapped data that is mapped from a first OFDM symbol in the non-LTE downlink control region.

Manner two: mapped data that is mapped to a corresponding symbol in the LTE downlink control region is determined based on whether a symbol in the non-LTE downlink control region includes a preset reference signal.

In some embodiments, in a case where a symbol in the LTE downlink control region includes a CRS, data on an OFDM symbol that includes the CRS is used as mapped data on an OFDM symbol that includes the CRS in the LTE downlink control region. In a case where the symbol in the LTE downlink control region does not include the CRS, data on an OFDM symbol that does not include the CRS is used as mapped data on an OFDM symbol that does not include the CRS in the LTE downlink control region.

Manner three: (X+Y) bits obtained by performing rate matching on a system message, a paging message, or a random access response message carried in the non-LTE downlink control region are determined, data of X bits is used as mapped data in a non-LTE downlink control channel region, and data of Y bits is used as mapped data in an LTE downlink control channel region.

In S503, the mapped data is merged with the data carried in the LTE downlink control region.

In the embodiment of the present disclosure, after the part of data that is mapped from the non-LTE downlink control region to obtain the data carried in the non-LTE downlink control region is determined, the mapped data in the non-LTE downlink control region is merged with the data carried in the LTE downlink control region for subsequent processing.

In the data receiving method provided by the embodiment of the present disclosure, the data carried in the non-LTE downlink control region and the LTE downlink control region of the subframe is received, the mapped data that is carried in the LTE downlink control region and mapped from the non-LTE downlink control region is determined, and the mapped data is merged with the data carried in the LTE downlink control region. For the MTC terminal, the received data includes the data carried in the non-LTE downlink control region and the data carried in the LTE downlink control region, thereby improving a peak rate of an MTC user.

Embodiment Three

Figure 6:
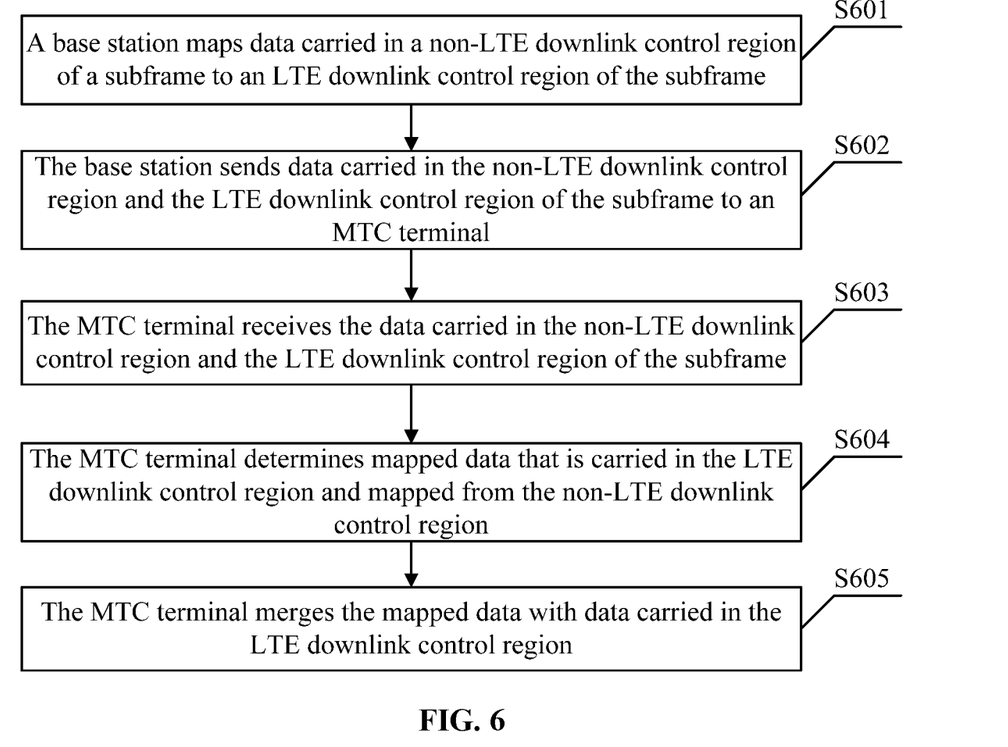
FIG. 6 is a flowchart of a data sending and receiving method according to embodiment three of the present disclosure.

An embodiment of the present disclosure provides a data sending and receiving method performed by an LTE-MTC system. As shown in FIG. 6, the data sending and receiving method includes steps described below.

In S601, a base station maps data carried in a non-LTE downlink control region of a subframe to an LTE downlink control region of the subframe.

In the embodiment of the present disclosure, the base station fully utilizes an idle LTE downlink control region to map part of data carried in the non-LTE downlink control region to the LTE downlink control region and determines, according to a preset mapping rule, which part of data in the non-LTE downlink control region is mapped to which position of the LTE downlink control region. The preset mapping rule includes at least manners described below.

Manner one: an index of an OFDM symbol to be mapped in the non-LTE downlink control region is determined based on a sequence number of resending of the data carried in the non-LTE downlink control region, and data on the OFDM symbol corresponding to the index is mapped to the LTE downlink control region. It is to be understood that the sequence number of resending of the data refers to which time the data is resent for.

Manner two: an index of data to be mapped in the non-LTE downlink control region is determined based on whether a symbol in the non-LTE downlink control region includes a preset reference signal, and MTC downlink control channel data on an OFDM symbol corresponding to the index is mapped to the LTE downlink control region.

Manner three: a rate of a system message, a paging message, or a random access response message carried in the non-LTE downlink control region is matched to (X+Y) bits, X bits are mapped to a non-LTE downlink control region, and Y bits are mapped to an LTE downlink control region.

Notably, to avoid repeated description, the preset mapping rule in the embodiment of the present disclosure is consistent with the preset mapping rule in embodiment one described above and is not described here again.

In S602, the base station sends data carried in the non-LTE downlink control region and the LTE downlink control region of the subframe to an MTC terminal.

In S603, the MTC terminal receives the data carried in the non-LTE downlink control region and the LTE downlink control region of the subframe.

In S604, the MTC terminal determines mapped data that is carried in the LTE downlink control region and mapped from the non-LTE downlink control region.

In the embodiment of the present disclosure, the MTC terminal knows a mapping manner in which the base station maps the data in the non-LTE downlink control region to the LTE downlink control region. The mapping manner may be sent to the MTC terminal after predetermined by the base station or may be determined through a negotiation between the MTC terminal and the base station, which is not limited here. For the MTC terminal, the MTC terminal determines the mapped data that is carried in the LTE downlink control region and mapped from the non-LTE downlink control region in at least manners described below.

Manner one: an index of an OFDM symbol that is mapped from the non-LTE downlink control region to the LTE downlink control region is determined based on the sequence number of resending of the data carried in the non-LTE downlink control region, and the data on the OFDM symbol corresponding to the index is used as the mapped data.

Manner two: mapped data that is mapped to a corresponding symbol in the LTE downlink control region is determined based on whether the symbol in the non-LTE downlink control region includes the preset reference signal.

Manner three: the (X+Y) bits obtained by performing rate matching on the system message, the paging message, or the random access response message carried in the non-LTE downlink control region are determined, data of X bits is used as mapped data in the non-LTE downlink control region, and data of Y bits is used as mapped data in the LTE downlink control region.

Notably, to avoid repeated description, the preset mapping rule in the embodiment of the present disclosure is consistent with the preset mapping rule in embodiment two described above and is not described here again.

In S605, the MTC terminal merges the mapped data with data carried in the LTE downlink control region.

In the data sending and receiving method provided by the embodiment of the present disclosure, the base station maps, according to the preset mapping rule, the data carried in the non-LTE downlink control region to the LTE downlink control region of the same subframe and sends the data carried in the non-LTE downlink control region and the LTE downlink control region of the subframe to the MTC terminal; after receiving the data, the MTC terminal merges the data carried in the non-LTE downlink control region with the data carried in the LTE downlink control region. In this manner, the base station sends data by using the LTE downlink control region that is no longer required, which can improve downlink transmission performance of an MTC device, and the MTC terminal receives the data, thereby improving a peak rate of an MTC user.

Embodiment Four

Figure 7:
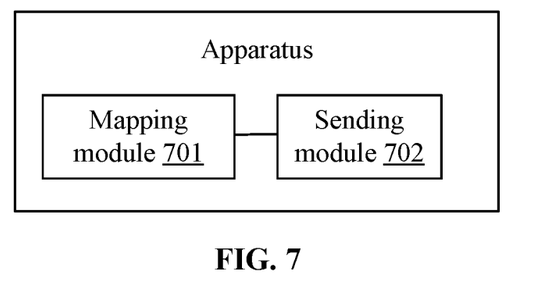
FIG. 7 is a structure diagram of an apparatus according to embodiment four of the present disclosure.

An embodiment of the present disclosure provides an apparatus. As shown in FIG. 7, the apparatus includes a mapping module 701 and a sending module 702.

The mapping module 701 is configured to map data carried in a non-LTE downlink control region of a subframe to an LTE downlink control region of the subframe.

The sending module 702 is configured to send data carried in the non-LTE downlink control region and the LTE downlink control region of the subframe to a machine-type communication (MTC) terminal.

It is to be understood that the mapping module 701 in the embodiment of the present disclosure maps the data carried in the non-LTE downlink control region of the subframe to the LTE downlink control region of the subframe in a manner described below.

The mapping module 701 determines an index of an OFDM symbol to be mapped in the non-LTE downlink control region based on a sequence number of resending of the data carried in the non-LTE downlink control region and maps data on the OFDM symbol corresponding to the index to the LTE downlink control region.

In some embodiments, in response the data carried in the non-LTE downlink control region including an MTC system message, the mapping module 701 determines the index of the OFDM symbol to be mapped in the non-LTE downlink control region and maps the data on the OFDM symbol corresponding to the index to the LTE downlink control region. The operation in which the index of the OFDM symbol to be mapped in the non-LTE downlink control region is determined and the data on the OFDM symbol corresponding to the index is mapped to the LTE downlink control region includes: in response to the sequence number of resending being n and a length of the LTE downlink control region being L, mapping data on a $(x_i+1)$-th OFDM symbol in the non-LTE downlink control region to an $(i+1)$-th OFDM symbol in the LTE downlink control region, where $$x_i = \left(\left\lfloor\frac{n-1}{T}\right\rfloor * L + i\right) \bmod (P-L),$$

where i=0, ..., L−1, T denotes a cyclic period of a redundancy version of the MTC system message, and P denotes the number of OFDM symbols in the subframe.

In response to the data carried in the non-LTE downlink control region including MTC downlink control channel data, the mapping module 701 determines the index of the OFDM symbol to be mapped in the non-LTE downlink control region based on a sequence number of resending of the MTC downlink control channel data and maps MTC downlink control channel data on the OFDM symbol corresponding to the index to the LTE downlink control region. The operation in which the index of the OFDM symbol to be mapped in the non-LTE downlink control region is determined and the MTC downlink control channel data on the OFDM symbol corresponding to the index is mapped to the LTE downlink control region includes: in response to the sequence number of resending being n and the length of the LTE downlink control region being L, mapping MTC downlink control channel data on a $(x_i+1)$-th OFDM symbol in the non-LTE downlink control region to an $(i+1)$-th OFDM symbol in the LTE downlink control region, where $x_i=((n-1)\times L+i) \bmod (P-L)$, where i=0, ..., L−1 and P denotes the number of OFDM symbols in the subframe.

In response to the data carried in the non-LTE downlink control region including MTC downlink data channel data, with a unit of Z subframes, the mapping module 701 determines the index of the OFDM symbol to be mapped in the non-LTE downlink control region based on a sequence number of resending of the MTC downlink data channel data in the Z subframes and maps MTC downlink data channel data on the OFDM symbol corresponding to the index to the LTE downlink control region. The operation in which the index of the OFDM symbol to be mapped in the non-LTE downlink control region is determined and the MTC downlink control channel data on the OFDM symbol corresponding to the index is mapped to the LTE downlink control region includes: in response to the sequence number of resending being n and the length of the LTE downlink control region being L, mapping MTC downlink data channel data on a $(x_i+1)$-th OFDM symbol in the non-LTE downlink control region to an $(i+1)$-th OFDM symbol in the LTE downlink control region, where $$x_i = \left(\left(n - 1 - \left\lfloor\frac{n-1}{Z}\right\rfloor \times Z\right) \times L + i\right) \bmod (P-L),$$

where i=0, ..., L−1, Z denotes the number of subframes that maintain the same redundancy version in the case of a redundancy version cycle of the MTC downlink data channel data, and P denotes the number of OFDM symbols in the subframe.

The mapping module 701 in the embodiment of the present disclosure maps the data carried in the non-LTE downlink control region of the subframe to the LTE downlink control region of the subframe in a manner described below.

The mapping module 701 determines an index of data to be mapped in the non-LTE downlink control region based on whether a symbol in the non-LTE downlink control region includes a preset reference signal and maps MTC downlink control channel data on an OFDM symbol corresponding to the index to the LTE downlink control region. In some embodiments, the mapping module 701 maps data on an OFDM symbol that includes a cell-specific reference signal (CRS) in the non-LTE downlink control region to an OFDM symbol that includes the CRS in the LTE downlink control region and maps data on an OFDM symbol that does not include the CRS in the non-LTE downlink control region to an OFDM symbol that does not include the CRS in the LTE downlink control region.

The mapping module 701 in the embodiment of the present disclosure maps the data carried in the non-LTE downlink control region of the subframe to the LTE downlink control region of the subframe in a manner described below.

A rate of a system message, a paging message, or a random access response message carried in the non-LTE downlink control region is matched to (X+Y) bits, X bits are mapped to a non-LTE downlink control region, and Y bits are mapped to an LTE downlink control channel region.

The apparatus provided by the embodiment of the present disclosure may be deployed on a first network device, and functions of the mapping module and the sending module may be implemented by a processor in the first network device.

With the apparatus provided by the embodiment of the present disclosure, the data carried in the non-LTE downlink control region is mapped to the LTE downlink control region of the same subframe according to a preset mapping rule, and the data carried in the non-LTE downlink control region and the LTE downlink control region of the subframe is sent to the MTC terminal. In the embodiment of the present disclosure, data of an MTC user is sent by using the LTE downlink control region that is no longer required, which can improve downlink transmission performance of an MTC device and improve a peak rate of the MTC user.

Embodiment Five

Figure 8:
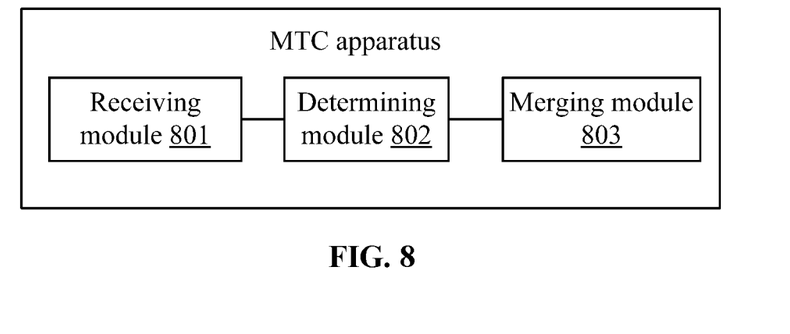
FIG. 8 is a structure diagram of an MTC apparatus according to embodiment five of the present disclosure.

An embodiment of the present disclosure provides an MTC apparatus. As shown in FIG. 8, the MTC apparatus includes a receiving module 801, a determining module 802 and a merging module 803.

The receiving module 801 is configured to receive data carried in a non-LTE downlink control region and an LTE downlink control region of a subframe.

The determining module 802 is configured to determine mapped data that is carried in the LTE downlink control region and mapped from the non-LTE downlink control region.

The merging module 803 is configured to merge the mapped data with data carried in the LTE downlink control region.

In the embodiment of the present disclosure, the determining module 802 determines the mapped data that is carried in the LTE downlink control region and mapped from the non-LTE downlink control region in a manner described below.

The determining module 802 determines an index of an OFDM symbol that is mapped from the non-LTE downlink control region to the LTE downlink control region based on a sequence number of resending of data carried in the non-LTE downlink control region and uses data on the OFDM symbol corresponding to the index as the mapped data.

In some embodiments, in response to the data carried in the non-LTE downlink control region including an MTC system message, the determining module 802 determines the index of the OFDM symbol that is mapped from the non-LTE downlink control region to the LTE downlink control region based on a sequence number of resending of the MTC system message in a sending period of the MTC system message and uses the data on the OFDM symbol corresponding to the index as the mapped data. The operation in which the index of the OFDM symbol that is mapped from the non-LTE downlink control region to the LTE downlink control region is determined and the data on the OFDM symbol corresponding to the index is used as the mapped data includes an operation described below.

In response to the sequence number of resending being n and a length of the LTE downlink control region being L, data on an (i+1)-th OFDM symbol in the LTE downlink control region is determined to be mapped data that is manned from a $(x_i+1)$-th OFDM symbol in the non-LTE downlink control region; where $$x_i = \left(\left\lfloor \frac{n-1}{T} \right\rfloor * L + i\right) \mod (P - L),$$

where i=0, . . . , L−1, T denotes a cyclic period of a redundancy version of the MTC system message, and P denotes the number of OFDM symbols in the subframe.

In response to the data carried in the non-LTE downlink control region including MTC downlink control channel data, the determining module 802 determines the index of the OFDM symbol that is mapped from the non-LTE downlink control region to the LTE downlink control region based on a sequence number of resending of the MTC downlink control channel data and uses MTC downlink control channel data on the OFDM symbol corresponding to the index as the mapped data. The index of the OFDM symbol where the MTC downlink control channel data mapped to the LTE downlink control region is located is determined in a manner described below.

In response to the sequence number of resending being n and the length of the LTE downlink control region being L, data on an (i+1)-th OFDM symbol in the LTE downlink control region is determined to be mapped data that is mapped from a $(x_i+1)$-th OFDM symbol in the non-LTE downlink control region; where $x_i=((n-1)\times L+i) \mod (P-L)$, where i=0, . . . , L−1 and P denotes the number of OFDM symbols in the subframe.

In response to the data carried in the non-LTE downlink control region including MTC downlink data channel data, with a unit of Z subframes, the determining module 802 determines the index of the OFDM symbol that is mapped from the non-LTE downlink control region to the LTE downlink control region based on a sequence number of resending of the MTC downlink data channel data in the Z subframes and uses MTC downlink control channel data on the OFDM symbol corresponding to the index as the mapped data. The index of the OFDM symbol where MTC downlink data channel data mapped to the LTE downlink control region is located is determined in a manner described below. In response to the length of the LTE downlink control region being L and the sequence number of resending being n, data on an (i+1)-th OFDM symbol in the LTE downlink control region is determined to be mapped data that is mapped from a $(x_i+1)$-th OFDM symbol in the non-LTE downlink control region; where $x_i=$ $$\left(\left(n-1-\left\lfloor \frac{n-1}{Z} \right\rfloor \times Z\right) \times L + i\right) \mod (P-L),$$

where i=0, . . . , L−1, Z denotes the number of subframes that maintain the same redundancy version in the case of a redundancy version cycle of the MTC downlink data channel data, and P denotes the number of OFDM symbols in the subframe.

In the embodiment of the present disclosure, the determining module 802 determines the mapped data that is carried in the LTE downlink control region and mapped from the non-LTE downlink control region in a manner described below.

Mapped data that is mapped to a corresponding symbol in the LTE downlink control region is determined based on whether a symbol in the non-LTE downlink control region includes a preset reference signal.

In some embodiments, in a case where a symbol in the LTE downlink control region includes a CRS, data on an OFDM symbol that includes the CRS is used as mapped data on an OFDM symbol that includes the CRS in the LTE downlink control region. In a case where the symbol in the LTE downlink control region does not include the CRS, data on an OFDM symbol that does not include the CRS is used as mapped data on an OFDM symbol that does not include the CRS in the LTE downlink control region.

In the embodiment of the present disclosure, the determining module 802 determines the mapped data that is carried in the LTE downlink control region and mapped from the non-LTE downlink control region in a manner described below.

(X+Y) bits obtained by performing rate matching on a system message, a paging message, or a random access response message carried in the non-LTE downlink control region are determined, data of X bits is used as mapped data in a non-LTE downlink control channel region, and data of Y bits is used as mapped data in an LTE downlink control channel region.

The MTC apparatus provided by the embodiment of the present disclosure may be deployed on a second network device, and functions of the receiving module, the determining and the merging module may be implemented by a processor in the second network device.

Figure 9:
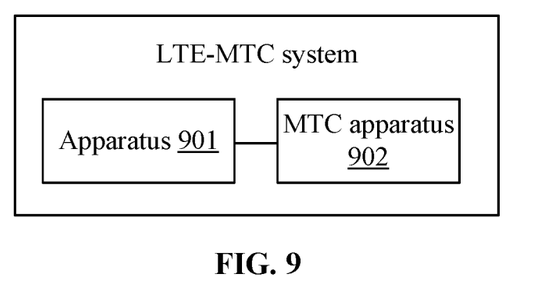
FIG. 9 is a structure diagram of an LTE-MTC system according to embodiment five of the present disclosure.

An embodiment of the present disclosure further provides an LTE-MTC system. As shown in FIG. 9, the LTE-MTC system includes an apparatus 901 and an MTC apparatus 902.

The apparatus 901 is configured to map data carried in a non-LTE downlink control region of a subframe to an LTE downlink control region of the subframe and send data carried in the non-LTE downlink control region and the LTE downlink control region of the subframe to the MTC apparatus 902.

The MTC apparatus 902 is configured to receive the data carried in the non-LTE downlink control region and the LTE downlink control region of the subframe, determine mapped data that is carried in the LTE downlink control region and mapped from the non-LTE downlink control region, and merge the mapped data with data carried in the LTE downlink control region.

Embodiment Six

Figure 10:
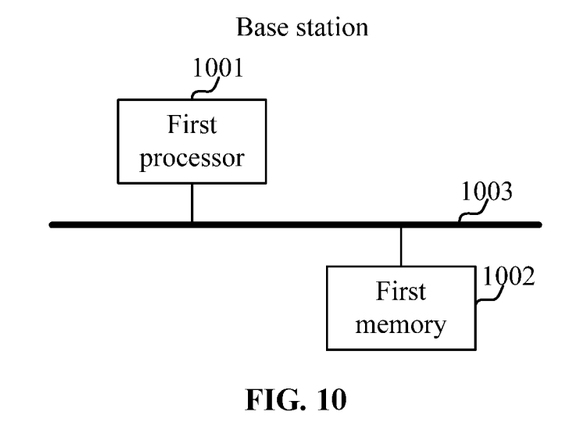
FIG. 10 is a structure diagram of a base station according to embodiment six of the present disclosure.

An embodiment of the present disclosure provides a base station. As shown in FIG. 10, the base station includes a first processor 1001, a first memory 1002 and a first communication bus 1003.

The first communication bus 1003 is configured to enable connection and communication between the first processor 1001 and the first memory 1002.

The first processor 1001 is configured to execute one or more programs stored in the first memory 1002 to perform steps of the data sending method in the embodiments described above.

Figure 11:
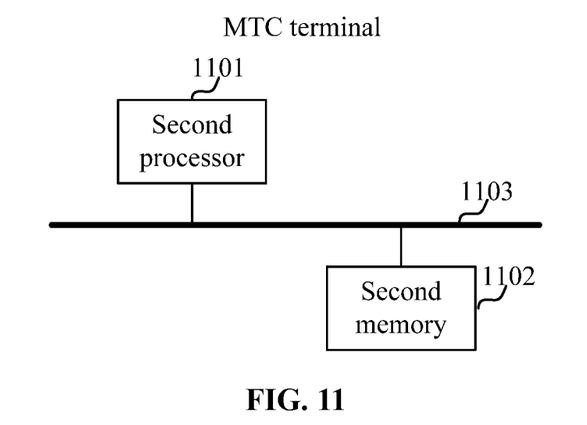
FIG. 11 is a structure diagram of an MTC terminal according to embodiment six of the present disclosure.

An embodiment of the present disclosure provides an MTC terminal. As shown in FIG. 11, the MTC terminal includes a second processor 1101, a second memory 1102 and a second communication bus 1103.

The second communication bus 1103 is configured to enable connection and communication between the second processor 1101 and the second memory 1102.

The second processor 1101 is configured to execute one or more programs stored in the second memory 1102 to perform steps of the data receiving method in the embodiments described above.

An embodiment of the present disclosure further provides a storage medium which stores one or more programs. The one or more programs are executable by one or more processors so that steps of the data sending method in the embodiments described above and/or steps of the data receiving method in the embodiments described above and/or steps of the data sending and receiving method in the embodiments described above are performable.

The storage medium includes a volatile or nonvolatile medium or a removable or non-removable medium implemented in various methods or technologies for storing information (such as computer-readable instructions, data structures, computer program modules or other data). The storage medium includes a random-access memory (RAM), a read-only memory (ROM), an electrically erasable programmable read-only memory (EEPROM), a flash memory, or other memory technologies, a compact disc read-only memory (CD-ROM), a digital video disk (DVD) or other optical storages, a magnetic cassette, a magnetic tape, a magnetic disk or other magnetic storage devices, or other media for storing desired information that can be accessed by a computer.

Some or all steps of the preceding method and function modules/units in the preceding system or apparatus may be implemented as software (which may be implemented by computer program codes executable by a computing device), firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

In addition, communication media generally include computer-readable instructions, data structures, computer program modules or other data in carriers or in modulated data signals transported in other transport mechanisms and may include any information delivery medium. Therefore, the present disclosure is not limited to any particular combination of hardware and software.

What is claimed is:

1. A data sending method, comprising:
   mapping data carried in a non-Long-Term Evolution (non-LTE) downlink control region of a subframe to an LTE downlink control region of the subframe; and
   sending data carried in the non-LTE downlink control region and the LTE downlink control region of the subframe to a machine-type communication (MTC) terminal;
   wherein mapping the data carried in the non-LTE downlink control region of the subframe to the LTE downlink control region of the subframe comprises:
   determining an index of an orthogonal frequency-division multiplexing (OFDM) symbol to be mapped in the non-LTE downlink control region based on a sequence number of resending of the data carried in the non-LTE downlink control region, and mapping data on the OFDM symbol corresponding to the index to the LTE downlink control region.

2. The method of claim 1, wherein mapping the data carried in the non-LTE downlink control region of the subframe to the LTE downlink control region of the subframe comprises:
   matching a rate of a system message, a paging message, or a random access response message carried in the non-LTE downlink control region to (X+Y) bits, mapping X bits to a non-LTE downlink control region, and mapping Y bits to an LTE downlink control region, wherein X denotes a number of bits before the system message, the paging message, or the random access response message carried in the non-LTE downlink control region is encoded, and X+Y denotes a number of bits after the system message, the paging message, or the random access response message carried in the non-LTE downlink control region is encoded;
   wherein mapping the Y bits to the LTE downlink control region comprises mapping the Y bits to an LTE downlink control region of at least one subframe.

3. The method of claim 1, comprising: in response to the data carried in the non-LTE downlink control region comprising an MTC system message, determining the index of the OFDM symbol to be mapped in the non-LTE downlink control region and mapping the data on the OFDM symbol corresponding to the index to the LTE downlink control region.

4. The method of claim 3, wherein determining the index of the OFDM symbol to be mapped in the non-LTE downlink control region and mapping the data on the OFDM symbol corresponding to the index to the LTE downlink control region comprises:
   in response to the sequence number of resending being n and a length of the LTE downlink control region being L, mapping data on a $(x_i+1)$-th OFDM symbol in the non-LTE downlink control region to an $(i+1)$-th OFDM symbol in the LTE downlink control region; wherein $$x_i = \left(\left\lfloor \frac{n-1}{T} \right\rfloor * L + i\right) \bmod (P-L)$$

wherein i=0, . . . , L−1, T denotes a cyclic period of a redundancy version of the MTC system message, and P denotes a number of OFDM symbols in the subframe.

5. The method of claim 1, comprising: in response to the data carried in the non-LTE downlink control region comprising MTC downlink control channel data, determining the index of the OFDM symbol to be mapped in the non-LTE downlink control region based on a sequence number of resending of the MTC downlink control channel data and mapping MTC downlink control channel data on the OFDM symbol corresponding to the index to the LTE downlink control region.

6. The method of claim 5, wherein determining the index of the OFDM symbol to be mapped in the non-LTE downlink control region and mapping the MTC downlink control channel data on the OFDM symbol corresponding to the index to the LTE downlink control region comprises:

in response to the sequence number of resending being n and a length of the LTE downlink control region being L, mapping MTC downlink control channel data on a $(x_i+1)$-th OFDM symbol in the non-LTE downlink control region to an (i+1)-th OFDM symbol in the LTE downlink control region; wherein $$x_i = ((n-1) \times L + i) \bmod (P-L)$$

wherein i=0, . . . , L−1 and P denotes a number of OFDM symbols in the subframe.

7. The method of claim 1, comprising: in response to the data carried in the non-LTE downlink control region comprising MTC downlink data channel data, with a unit of Z subframes, determining the index of the OFDM symbol to be mapped in the non-LTE downlink control region based on a sequence number of resending of the MTC downlink data channel data in the Z subframes and mapping MTC downlink data channel data on the OFDM symbol corresponding to the index to the LTE downlink control region.

8. The method of claim 7, wherein determining the index of the OFDM symbol to be mapped in the non-LTE downlink control region and mapping the MTC downlink data channel data on the OFDM symbol corresponding to the index to the LTE downlink control region comprises:

in response to the sequence number of resending being n and a length of the LTE downlink control region being L, mapping MTC downlink data channel data on a $(x_i+1)$-th OFDM symbol in the non-LTE downlink control region to an (i+1)-th OFDM symbol in the LTE downlink control region; wherein $$x_i = \left(\left(n - 1 - \left\lfloor \frac{n-1}{Z} \right\rfloor \times Z\right) \times L + i\right) \bmod (P - L)$$

wherein i=0, . . . , L−1, Z denotes a number of subframes that maintain a same redundancy version in a case of a redundancy version cycle of the MTC downlink data channel data, and P denotes a number of OFDM symbols in the subframe.

9. The method of claim 1, wherein mapping the data carried in the non-LTE downlink control region of the subframe to the LTE downlink control region of the subframe comprises:

determining an index of data to be mapped in the non-LTE downlink control region based on whether a symbol in the non-LTE downlink control region comprises a preset reference signal, and mapping MTC downlink control channel data on an OFDM symbol corresponding to the index to the LTE downlink control region.

10. An apparatus, comprising a processor and a memory storing processor-executable instructions which, when executed by the processor, are configured to implement the method of claim 1.

11. A data sending and receiving method, comprising:

mapping, by a base station, data carried in a non-Long-Term Evolution (non-LTE) downlink control region of a subframe to an LTE downlink control region of the subframe;

sending, by the base station, data carried in the non-LTE downlink control region and the LTE downlink control region of the subframe to a machine-type communication (MTC) terminal;

receiving, by the MTC terminal, the data carried in the non-LTE downlink control region and the LTE downlink control region of the subframe;

determining, by the MTC terminal, mapped data that is carried in the LTE downlink control region and mapped from the non-LTE downlink control region; and merging, by the MTC terminal, the mapped data with data carried in the LTE downlink control region;

wherein mapping the data carried in the non-LTE downlink control region of the subframe to the LTE downlink control region of the subframe comprises:

determining an index of an orthogonal frequency-division multiplexing (OFDM) symbol to be mapped in the non-LTE downlink control region based on a sequence number of resending of the data carried in the non-LTE downlink control region, and mapping data on the OFDM symbol corresponding to the index to the LTE downlink control region; and wherein determining the mapped data that is carried in the LTE downlink control region and mapped from the non-LTE downlink control region comprises:

determining an index of an orthogonal frequency-division multiplexing (OFDM) symbol that is mapped from the non-LTE downlink control region to the LTE downlink control region based on a sequence number of resending of data carried in the non-LTE downlink control region, and using data on the OFDM symbol corresponding to the index as the mapped data.

12. A Long-Term Evolution (LTE)-machine-type communication (LTE-MTC) system, comprising a processor and a memory storing processor-executable instructions which, when executed by the processor, are configured to implement the method of claim 11.

13. A data receiving method for machine-type communication (MTC), comprising:

receiving data carried in a non-Long-Term Evolution (non-LTE) downlink control region and an LTE downlink control region of a subframe;

determining mapped data that is carried in the LTE downlink control region and mapped from the non-LTE downlink control region; and merging the mapped data with data carried in the LTE downlink control region;

wherein determining the mapped data that is carried in the LTE downlink control region and mapped from the non-LTE downlink control region comprises:

determining an index of an orthogonal frequency-division multiplexing (OFDM) symbol that is mapped from the non-LTE downlink control region to the LTE downlink control region based on a sequence number of resending of data carried in the non-LTE downlink control region, and using data on the OFDM symbol corresponding to the index as the mapped data.

14. The method of claim 13, comprising: in response to the data carried in the non-LTE downlink control region comprising MTC downlink data channel data, with a unit of Z subframes, determining the index of the OFDM symbol that is mapped from the non-LTE downlink control region to the LTE downlink control region based on a sequence number of resending of the MTC downlink data channel data in the Z subframes and using MTC downlink data channel data on the OFDM symbol corresponding to the index as the mapped data;
  wherein determining the index of the OFDM symbol that is mapped from the non-LTE downlink control region to the LTE downlink control region and using MTC downlink data channel data on the OFDM symbol corresponding to the index as the mapped data comprises:
  in response to the sequence number of resending being n and a length of the LTE downlink control region being L, determining data on an (i+1)-th OFDM symbol in the LTE downlink control region to be mapped data that is mapped from a ($x_i$+1)-th OFDM symbol in the non-LTE downlink control region; wherein $$x_i = \left(\left(n-1-\left\lfloor\frac{n-1}{Z}\right\rfloor \times Z\right)\times L + i\right) \bmod (P-L)$$

wherein i=0, ..., L−1, Z denotes a number of subframes that maintain a same redundancy version in a case of a redundancy version cycle of the MTC downlink data channel data, and P denotes a number of OFDM symbols in the subframe.

15. The method of claim 13, wherein determining the mapped data that is carried in the LTE downlink control region and mapped from the non-LTE downlink control region comprises:
  determining, based on whether a symbol in the non-LTE downlink control region comprises a preset reference signal, mapped data that is mapped to a corresponding symbol in the LTE downlink control region.

16. The method of claim 13, comprising: in response to the data carried in the non-LTE downlink control region comprising an MTC system message, determining the index of the OFDM symbol that is mapped from the non-LTE downlink control region to the LTE downlink control region based on a sequence number of resending of the MTC system message in a sending period of the MTC system message and using the data on the OFDM symbol corresponding to the index as the mapped data;
  wherein determining the index of the OFDM symbol that is mapped from the non-LTE downlink control region to the LTE downlink control region and using the data on the OFDM symbol corresponding to the index as the mapped data comprises:
  in response to the sequence number of resending being n and a length of the LTE downlink control region being L, determining data on an (i+1)-th OFDM symbol in the LTE downlink control region to be mapped data that is mapped from a ($x_i$+1)-th OFDM symbol in the non-LTE downlink control region; wherein $$x_i = \left(\left\lfloor\frac{n-1}{T}\right\rfloor * L + i\right) \bmod (P-L)$$

wherein i=0, ..., L−1, T denotes a cyclic period of a redundancy version of the MTC system message, and P denotes a number of OFDM symbols in the subframe.

17. A machine-type communication (MTC) apparatus, comprising a processor and a memory storing processor-executable instructions which, when executed by the processor, are configured to implement the method of claim 13.

18. The method of claim 13, comprising: in response to the data carried in the non-LTE downlink control region comprising MTC downlink control channel data, determining the index of the OFDM symbol that is mapped from the non-LTE downlink control region to the LTE downlink control region based on a sequence number of resending of the MTC downlink control channel data and using MTC downlink control channel data on the OFDM symbol corresponding to the index as the mapped data;
  wherein determining the index of the OFDM symbol that is mapped from the non-LTE downlink control region to the LTE downlink control region and using the MTC downlink control channel data on the OFDM symbol corresponding to the index as the mapped data comprises:
  in response to the sequence number of resending being n and a length of the LTE downlink control region being L, determining data on an (i+1)-th OFDM symbol in the LTE downlink control region to be mapped data that is mapped from a ($x_i$+1)-th OFDM symbol in the non-LTE downlink control region; wherein
  $x_i = ((n-1) \times L + i) \bmod (P-L)$ wherein i=0, ..., L−1 and P denotes a number of OFDM symbols in the subframe.

* * * * *